(12) United States Patent
Nakamura

(10) Patent No.: US 11,319,749 B2
(45) Date of Patent: May 3, 2022

(54) RETROREFLECTIVE WINDOW

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 162 days.

(21) Appl. No.: 16/968,845

(22) PCT Filed: Dec. 10, 2018

(86) PCT No.: PCT/JP2018/045339
§ 371 (c)(1),
(2) Date: Aug. 10, 2020

(87) PCT Pub. No.: WO2019/155754
PCT Pub. Date: Aug. 15, 2019

(65) Prior Publication Data
US 2021/0017810 A1    Jan. 21, 2021

(30) Foreign Application Priority Data

Feb. 9, 2018 (JP) .............................. JP2018-021509

(51) Int. Cl.
*E06B 9/24* (2006.01)
*G02B 5/124* (2006.01)
*E06B 3/40* (2006.01)

(52) U.S. Cl.
CPC ................ *E06B 9/24* (2013.01); *G02B 5/124* (2013.01); *E06B 3/40* (2013.01); *E06B 2003/403* (2013.01); *E06B 2009/2417* (2013.01)

(58) Field of Classification Search
CPC ........ E06B 9/24; E06B 3/40; E06B 2003/403; E06B 2009/2417; E06B 2009/2464; G02B 5/124; F27S 11/007
See application file for complete search history.

(56) References Cited

U.S. PATENT DOCUMENTS

2011/0199685 A1    8/2011  Ito
2015/0285454 A1*  10/2015  Aizenberg ............. G02B 26/08
                                                                   29/428
(Continued)

FOREIGN PATENT DOCUMENTS

| BR | PI0613835 A2 * | 2/2011 | ............. G02B 5/124 |
| JP | 2003-202159 A | 7/2003 | |
| JP | 2014-142669 A | 8/2014 | |

*Primary Examiner* — Christopher E Mahoney
(74) *Attorney, Agent, or Firm* — Kenealy Vaidya LLP

(57) ABSTRACT

Provided is a retroreflective window which can block a direct light ray and reflect it to a sun side while maintaining a viewability and enhance a usability of the direct light ray. The retroreflective window (1 to 3) includes first and second transparent plate materials, a transparent first prism which is disposed between the first and second transparent plate materials, and a switching member which is installed facing a second side of the first prism and can be switched between a reflective state in which a reflectance of visible light rays and infrared rays is 70% or more and a non-reflective state in which the reflectance of visible light rays and infrared rays is 30% or less. When the switching member is in the reflective state, in the first prism, a light ray incident at a predetermined angle or more is emitted from the first transparent plate material at approximately the same angle as when entering, after being reflected by the switching member and a third side, and among light rays which enter at an angle less than the predetermined angle, the light ray reaching the third side is transmitted and emitted from the second transparent plate material.

4 Claims, 11 Drawing Sheets

(56) References Cited

U.S. PATENT DOCUMENTS

| | | |
|---|---|---|
| 2017/0115437 A1 | 4/2017 | Ito |
| 2019/0153776 A1* | 5/2019 | Arima .................... E06B 9/40 |
| 2019/0204484 A1 | 7/2019 | Ito |
| 2021/0047883 A1* | 2/2021 | Nakamura ............... E06B 9/24 |

* cited by examiner

FIG. 6

APEX ANGLE 25°

| MATERIAL | REFRACTIVE INDEX | FIRST BASE ANGLE | | | | | | | |
|---|---|---|---|---|---|---|---|---|---|
| | | 105° | 100° | 95° | 90° | 85° | 80° | 75° | |
| POROUS MATERIAL OR THE LIKE | 1.17 | 41 | 41 | 41 | 41 | 41 | 41 | 41 | |
| POROUS MATERIAL OR THE LIKE | 1.25 | 37 | 37 | 37 | 37 | 37 | 37 | 37 | |
| POROUS MATERIAL OR THE LIKE | 1.30 | 41 | 34 | 34 | 34 | 34 | 34 | 41 | |
| WATER AND FLUORORUBBER | 1.33 | 44 | 37 | 33 | 33 | 33 | 37 | 44 | |
| 20% SALINE SOLUTION AND FLUORORESIN | 1.37 | 49 | 41 | 33 | 31 | 33 | 41 | 49 | |
| SILICONE AND ACRYLIC | 1.41 | 54 | 45 | 37 | 30 | 37 | 45 | 54 | |
| BOROSILICATE GLASS | 1.48 | 65 | 53 | 44 | 35 | 44 | 53 | 65 | |
| SODA LIME GLASS | 1.52 | 73 | 58 | 48 | 38 | 48 | 58 | 73 | |
| POLYCARBONATE | 1.59 | NG | 70 | 56 | 45 | 56 | 70 | NG | |

FIG. 7

APEX ANGLE 30°

| MATERIAL | REFRACTIVE INDEX | FIRST BASE ANGLE | | | | | | | |
|---|---|---|---|---|---|---|---|---|---|
| | | 105° | 100° | 95° | 90° | 85° | 80° | 75° | |
| POROUS MATERIAL OR THE LIKE | 1.17 | 35 | 35 | 35 | 35 | 35 | 35 | 35 | |
| POROUS MATERIAL OR THE LIKE | 1.25 | 30 | 30 | 30 | 30 | 30 | 30 | 30 | |
| POROUS MATERIAL OR THE LIKE | 1.30 | 33 | 27 | 27 | 27 | 27 | 27 | 33 | |
| WATER AND FLUORORUBBER | 1.33 | 37 | 29 | 26 | 26 | 26 | 29 | 37 | |
| 20% SALINE SOLUTION AND FLUORORESIN | 1.37 | 41 | 33 | 26 | 24 | 26 | 33 | 41 | |
| SILICONE AND ACRYLIC | 1.41 | 45 | 37 | 29 | 22 | 29 | 37 | 45 | |
| BOROSILICATE GLASS | 1.48 | 53 | 44 | 35 | 27 | 35 | 44 | 53 | |
| SODA LIME GLASS | 1.52 | 58 | 48 | 38 | 30 | 38 | 48 | 58 | |
| POLYCARBONATE | 1.59 | 70 | 56 | 45 | 35 | 45 | 56 | 70 | |

FIG. 8

APEX ANGLE 35°

| MATERIAL | REFRACTIVE INDEX | FIRST BASE ANGLE ||||||||
|---|---|---|---|---|---|---|---|---|
| | | 105° | 100° | 95° | 90° | 85° | 80° | 75° |
| POROUS MATERIAL OR THE LIKE | 1.17 | 29 | 29 | 29 | 29 | 29 | 29 | 29 |
| POROUS MATERIAL OR THE LIKE | 1.25 | 23 | 23 | 23 | 23 | 23 | 23 | 23 |
| POROUS MATERIAL OR THE LIKE | 1.30 | 27 | 21 | 21 | 21 | 21 | 21 | 27 |
| WATER AND FLUORORUBBER | 1.33 | 29 | 22 | 19 | 19 | 19 | 22 | 29 |
| 20% SALINE SOLUTION AND FLUORORESIN | 1.37 | 33 | 26 | 19 | 17 | 19 | 26 | 33 |
| SILICONE AND ACRYLIC | 1.41 | 37 | 29 | 22 | 14 | 22 | 29 | 37 |
| BOROSILICATE GLASS | 1.48 | 44 | 35 | 27 | 19 | 27 | 35 | 44 |
| SODA LIME GLASS | 1.52 | 48 | 38 | 30 | 22 | 30 | 38 | 48 |
| POLYCARBONATE | 1.59 | 56 | 45 | 35 | 27 | 35 | 45 | 56 |

RETROREFLECTIVE WINDOW

TECHNICAL FIELD

The present invention relates to a retroreflective window.

BACKGROUND ART

Sunlight consists of about half of visible light rays and about half of infrared light rays. Therefore, in order to suppress the demand for cooling in the summer, a window which cuts infrared rays while allowing visible rays of sunlight to pass has been proposed. In order to cut infrared rays, there are a method of absorbing infrared rays and a method of reflecting infrared rays. However, in the former case, the window becomes hot and heat is radiated from the window, so the latter reflection method is effective. However, since the window which simply reflects infrared rays reflects the heat rays of the sunlight arriving from above downward, the ground in front of the building warms up, leading to a heat island phenomenon.

For such a problem, a special film which reflects infrared rays upward (toward the sun) has been proposed (see Patent Literature 1). This film has an optical functional layer which reflects light rays in an infrared band and transmits light rays in a visible band, for example, in a zigzag cross-section shape. In this film, a visible light ray is transmitted through the optical functional layer and taken into the room, and an infrared light ray is reflected to the sun side by the zigzag-shaped optical functional layer.

However, although the film described in Patent Literature 1 allows visible light rays to transmit and makes it visible to the scenery outside the window, it also transmits visible light rays from the sun. Therefore, the film still requires means for blocking direct light rays such as blinds.

Therefore, a selective transmission/reflection material has been proposed that includes a transparent portion which is inclined to totally reflect light rays having an incident angle of a predetermined value or more and a mirror surface which is provided so as to reflect the light ray in an incident direction (see Patent Literature 2). According to this selective transmission/reflection material, a direct light ray from the sun arriving at a predetermined incident angle or more can be reflected to the sun side and a light ray arriving at an incident angle less than the predetermined value can be transmitted. Therefore, it eliminates the need for another means of blocking the direct light ray and ensures the view of the scenery outside the window.

Citation List

Patent Literature

[Patent Literature 1]: JP-A-2014-142669
[Patent Literature 2]: JP-A-2003-202159

SUMMARY OF INVENTION

Technical Problem

However, since the selective transmission/reflection material described in Patent Literature 2 merely reflects the direct light ray from the sun to the sun side, it is preferable when a user does not want to take in the direct light ray. However, for example, when it is desired to take the direct light ray into the room to make the room brighter without using a lighting device, the direct light ray cannot be used. As a result, the usability of the direct light ray is reduced.

The invention is made to solve such a problem and an object thereof is to provide a retroreflective window which can block a direct light ray and reflect it to a sun side while maintaining a viewability and enhance a usability of the direct light ray.

Solution to Problem

A retroreflective window according to the invention includes first and second transparent plate materials, a transparent triangular prism located between the first and second transparent plate materials, and a switching member which can be switched between a reflective state and a non-reflective state. When the switching member is in the reflective state, in the triangular prism, a light ray which enters at a predetermined angle or more is emitted from the first transparent plate material at about the same angle as when entering, and among light rays which enter at an angle smaller than the predetermined angle, the light ray which reaches the third side is transmitted and emitted from the second transparent plate material.

Advantageous Effects of Invention

According to the invention, when the switching member is in the reflective state, in the triangular prism, a light ray incident at a predetermined angle or more is emitted from the first transparent plate material at approximately the same angle as when entering, after being reflected by the switching member and the third side, and among light rays which enter at an angle less than the predetermined angle, the light ray reaching the third side is transmitted and emitted from the second transparent plate material. Therefore, the direct light ray from the sun can be reflected to the sun side and the light ray such as the scenery at an angle smaller than the predetermined angle can be captured. Furthermore, since the switching member can be switched not only to the reflective state but also to the non-reflective state, not only the direct light ray is reflected to the sun side, but also the state can be changed the non-reflective to enhance the usability of the direct light ray. Therefore, it is possible to provide a retroreflective window capable of blocking the direct light ray and reflecting it to the sun side while maintaining the viewability and enhancing the usability of the direct light ray.

BRIEF DESCRIPTION OF DRAWINGS

FIG. 3A illustrates a first optical path, FIG. 3B illustrates a second optical path, FIG. 3C illustrates a third optical path, and FIG. 3D illustrates fourth and fifth optical paths.

FIG. 5A illustrates a sixth optical path, FIG. 5B illustrates a seventh optical path, and FIG. 5C illustrates an eighth optical path.

FIG. 6 is a chart illustrating a relationship between an angle of a first base angle and a predetermined angle (rounded up by 1° unit) when a refractive index of the prism is changed, when an apex angle of the prism is 25°.

FIG. 7 is a chart illustrating the relationship between the angle of the first base angle and the predetermined angle when the refractive index of the prism is changed, when the apex angle of the prism is 30°.

FIG. 8 is a chart illustrating the relationship between the angle of the first base angle and the predetermined angle when the refractive index of the prism is changed, when the apex angle of the prism is 35°.

DESCRIPTION OF EMBODIMENTS

Hereinafter, the invention will be described along with preferred embodiments. The invention is not limited to the embodiments described below and can be modified as appropriate without departing from the spirit of the invention. Further, in the embodiment described below, there is a part where illustration and description of a part of the configuration are omitted. However, regarding the details of the omitted technique, it goes without saying that a known or well-known technique is appropriately applied to the extent that there is no contradiction with the contents described below.

Figure 1:
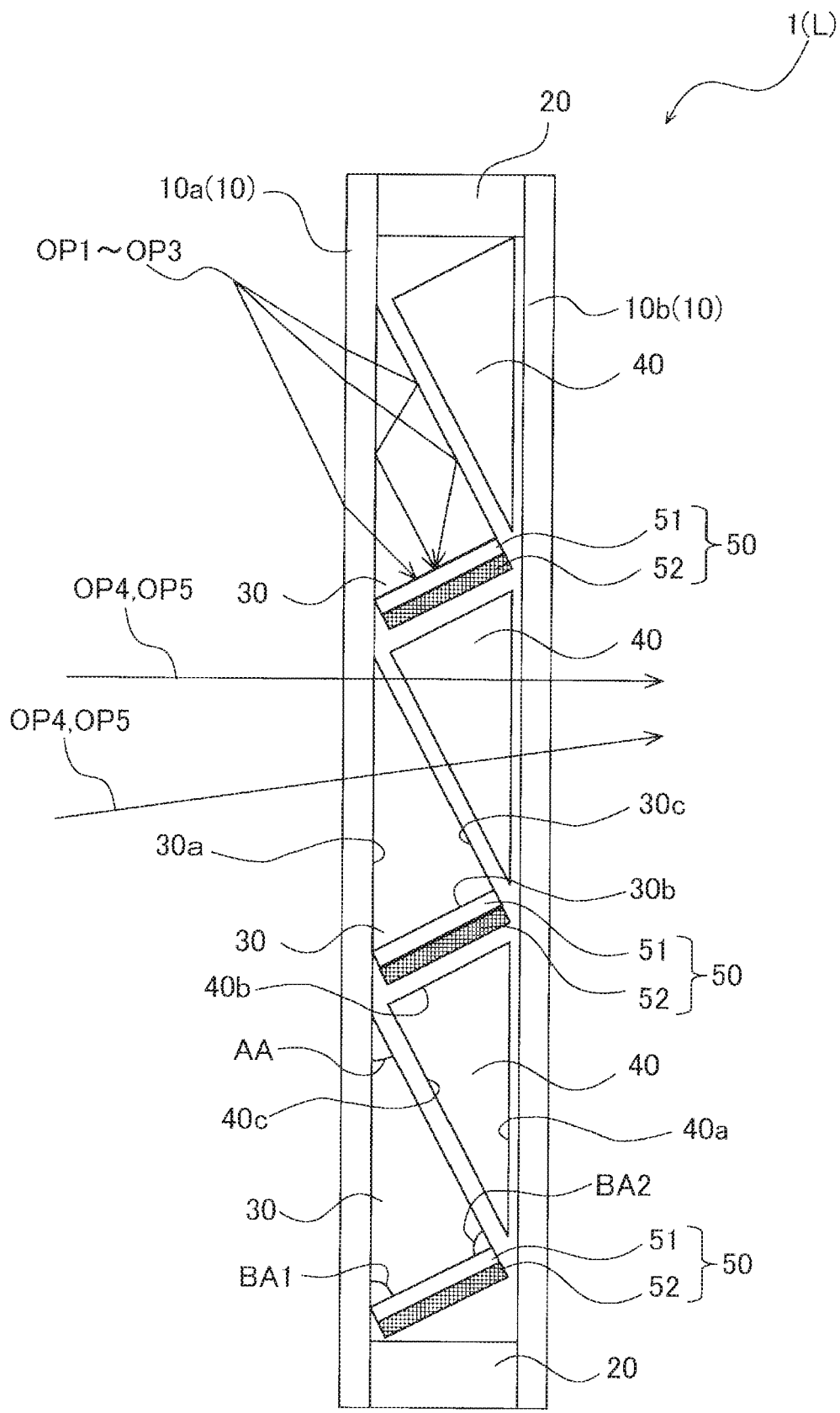
FIG. 1 is a schematic side view illustrating a retroreflective window according to a first embodiment of the invention.

FIG. 1 is a schematic side view illustrating a retroreflective window according to a first embodiment of the invention. A retroreflective window 1 according to an example illustrated in FIG. 1 schematically includes two transparent plate materials 10, a peripheral end member 20, a plurality of first prisms (triangular prisms) 30, a plurality of second prisms (second triangular prisms) 40, and a plurality of switching members 50.

The two transparent plate materials 10 are transparent plate materials arranged substantially parallel to each other. Those transparent plate materials 10 are made of, for example, a glass material. In a state illustrated in FIG. 1, of the two transparent plate materials 10, the outdoor side becomes a first transparent plate material 10a and the indoor side becomes a second transparent plate material 10b.

The peripheral end member 20 is interposed between the two transparent plate materials 10 at the peripheral end portions of the two transparent plate materials 10. By providing the peripheral end member 20 on the peripheral end portions of the two transparent plate materials 10, an internal space closed by the two transparent plate materials 10 and the peripheral end member 20 is formed. In the embodiment, the internal space is in a vacuum state from the viewpoint of heat insulation, but not limited to this, it may be filled with a gas such as air, argon, or krypton.

The plurality of first prisms 30 are prisms (that is, a prism having a triangular prism shape) which are arranged between the first and second transparent plate materials 10a and 10b and each have a triangular shape in cross section. Those first prisms 30 are arranged facing the first transparent plate material 10a such that a first side 30a is along the first transparent plate material 10a when viewed in cross section. Particularly, in the first embodiment, the first side 30a is provided in contact with the first transparent plate material 10a. A second side 30b and a third side 30c of the first prism 30 extend at a predetermined angle with respect to the first side 30a. The second side 30b is a side located vertically below the third side 30c.

In the embodiment, the first prism 30 is made of a solid glass material or resin material. However, it not limited to this and may be composed of a prism wall forming the outer wall of the first prism 30 and an internal member made of a transparent liquid sealed inside the prism wall. The internal member is not limited to a transparent liquid and may be a transparent gel or solid. In addition, the first transparent plate material 10a may also serve as a part of the prism wall.

Each of the plurality of second prisms 40 is a prism (that is, a prism having a triangular prism shape) having a triangular shape in cross section and has the same shape and the same refractive index as the first prism 30. Those second prisms 40 have a point-symmetrical orientation obtained by rotating the first prism 30 by 180° and one second prism 40 is provided for each first prism 30. Here, when only the first prism 30 is provided, the light is refracted by the first prism 30 and the scenery when viewed from the inside of the room side is distorted. However, since the second prism 40 is provided as a pair with the first prism 30, distortion of the scenery when viewed from the inside of the room is suppressed (an image restoration effect is provided). The second prism 40 may be composed of a prism wall and an internal member similarly to the first prism 30 or may be composed of a solid member.

Specifically, the second prisms 40 are arranged facing the second transparent plate material 10b so that fourth sides 40a of the second prisms 40 are along the second transparent plate material 10b. A fifth side 40b and a sixth side 40c of the second prism 40 extend at a predetermined angle with respect to the fourth side 40a. The fifth side 40b is located vertically above the sixth side 40c. In such a second prism 40, the sixth side 40c faces the third side 30c of the first prism 30 adjacent in the horizontal direction and the fifth side 40b faces the second side 30b of the first prism 30 adjacent in the vertical direction.

The plurality of switching members 50 are members arranged to face the second side 30b of the first prism 30 and can switch the state between a reflective state and a non-reflective state. The switching member 50 has a reflectance of visible light and infrared rays of 70% or more in the reflective state and a reflectance of visible light and infrared rays of 30% or less in the non-reflection state.

In particular, in the first embodiment, in the switching member 50, one surface is a reflection layer 51 having a reflectance of visible light and infrared rays of 70% or more and is provided in contact with the second side 30b of the first prism 30. On the other hand, the other surface (the back surface side of the reflection layer 51) of the switching member 50 is an absorption layer 52 having an absorption rate of visible light and infrared rays of 70% or more and is opposed to the fifth side 40b of the second prism 40 with a space therebetween.

In addition, in the embodiment, the second prism 40 is arranged with a minute gap between the first prism 30 and the second transparent plate material 10b. Interposition members such as minute columns and particles are interposed between those so as to maintain a minute gap. As a result, the retroreflective window 1 has a laminated structure of the first prism 30, the interposition member, the second prism 40, the interposition member, and the second transparent plate material 10b in this order, and even when the internal space is in a vacuum state, it will be supported to withstand the pressure.

Figure 2:
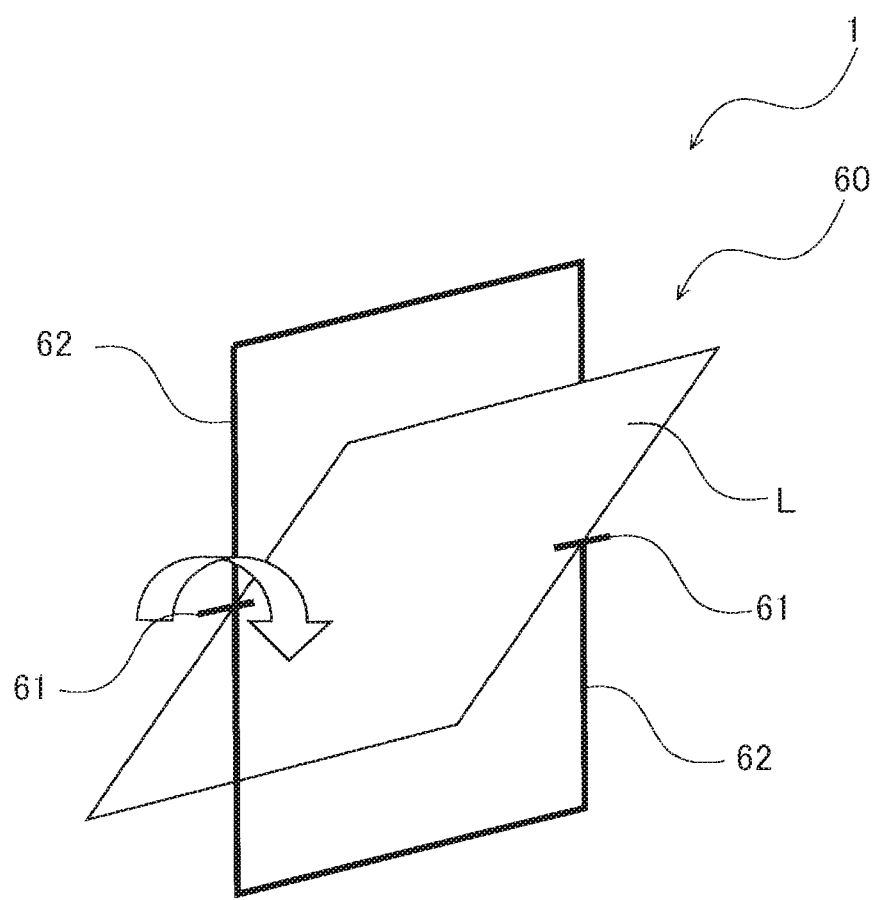
FIG. 2 is a perspective view illustrating the retroreflective window according to the first embodiment and illustrates a rotation mechanism.

FIG. 2 is a perspective view illustrating the retroreflective window 1 according to the first embodiment, showing a rotation mechanism. In the following description, a structure (two transparent plate materials 10, peripheral end members 20, first prism 30, second prism 40, and switching member 50) excluding a rotation mechanism 60 in the retroreflective window 1 is referred to as a laminated body (flat plate body) L.

As illustrated in FIG. 2, the retroreflective window 1 includes the rotation mechanism 60 in addition to the laminated body L. The rotation mechanism 60 includes a pivot 61, a window frame 62, and locking means (not illustrated) and can rotate in the vertical direction while maintaining the left and right positions of the laminated body L.

Specifically, the pivot 61 is a rotary shaft member provided at the center of the left and right sides of the laminated body L extending vertically. The window frame 62 is a rectangular frame member into which the laminated body L is fitted and is provided with a rotation hole (not illustrated) into which the pivot 61 is inserted in the center of the left and right sides extending vertically. Locking means (not illustrated) is for fixing the laminated body L in a state where the laminated body L is fitted in the window frame 62.

With such a configuration, a user can release the locking means and rotate the stacked body L around the pivot 61. After the rotation, a user locks and fixes the laminated body L on the window frame 62 by the locking means. In this way, the laminated body L can be rotated vertically about the pivot 61, and at the time of rotation, it is possible to perform vertical rotation where the relative positions of the one plate member 10a and the other plate member 10b are switched while maintaining the left and right positions of the laminated body L.

Figure 3A:
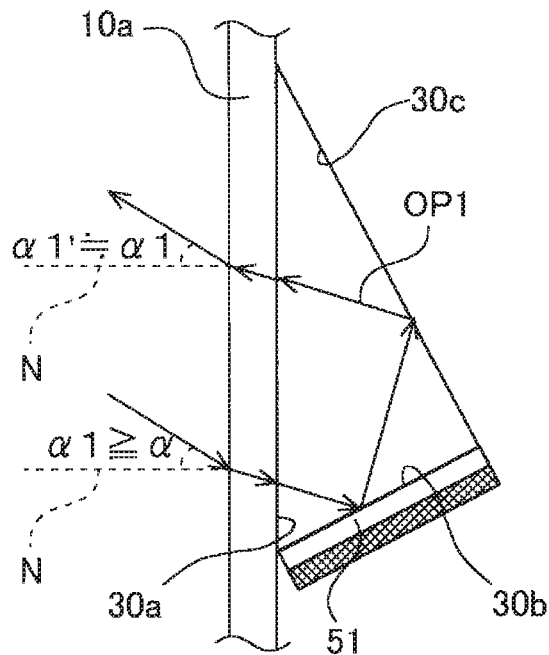
FIGS. 3A to 3D are conceptual diagrams illustrating optical paths of the retroreflective window according to the first embodiment, where
Figure 3B:
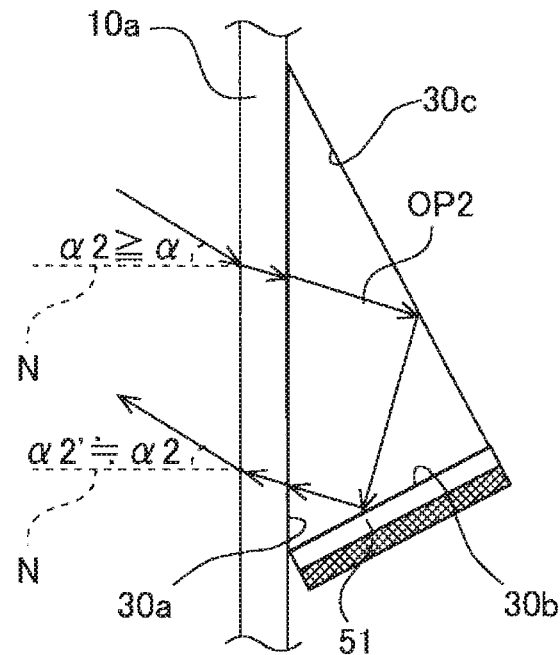
Figure 3C:
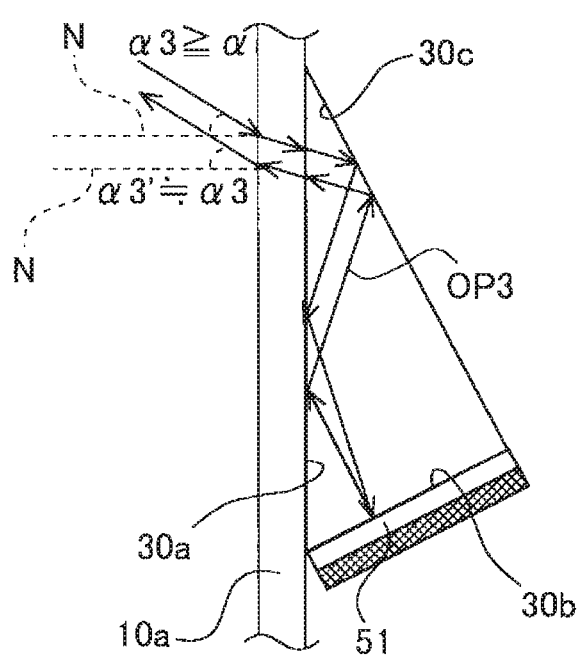
Figure 3D:
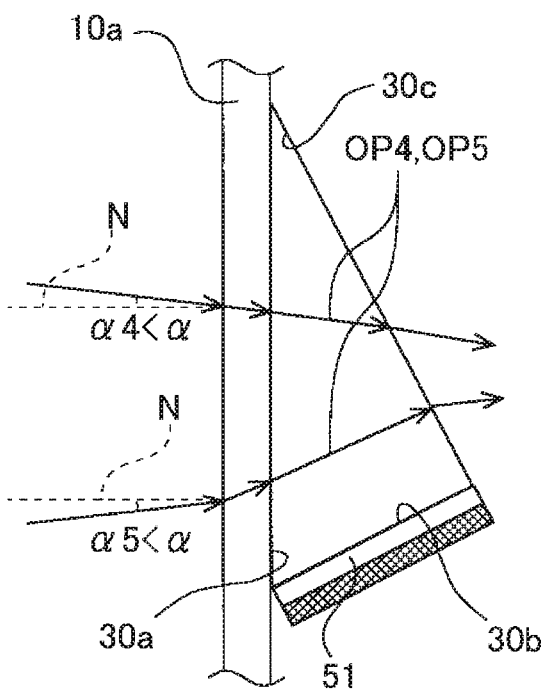

Here, in the embodiment, the first prism 30 has a refractive index and each internal angle of a triangle set so that following optical paths OP1 to OP5 are realized. FIGS. 3A to 3D are conceptual diagrams illustrating the optical paths OP1 to OP5 of the retroreflective window 1 according to the first embodiment, where FIG. 3A illustrates the first optical path OP1, FIG. 3B illustrates the second optical path OP2, FIG. 3C illustrates the third optical path OP3, and FIG. 3D illustrates the fourth and fifth optical paths OP4 and OP5.

Of the first to fifth optical paths OP1 to OP5, the first to third optical paths OP1 to OP3 are optical paths for a light ray which is incident on the first transparent plate material 10a when an angle (that is, the elevation angle when used in an upright position) with respect to a normal line N of the first transparent plate material 10a is a predetermined angle α or more and enters the triangular prism 30 from the first side 30a.

As illustrated in FIG. 3A, the first optical path OP1 is an optical path where a light ray entering at a predetermined angle α or more first reaches the second side 30b, is totally reflected (70% of reflection or more) by the reflection layer 51, reaches the third side 30c, and is totally reflected (theoretical total reflection) by the third side 30c, and then the light ray is emitted from the first transparent plate material 10a toward the sun side at an angle α1' which is substantially the same as an approach angle α1.

As illustrated in FIG. 3B, the second optical path OP2 is an optical path where a light ray entering at a predetermined angle α or more first reaches the third side 30c, is totally reflected (theoretical total reflection) at the third side 30c, reaches the second side 30b, and is totally reflected (70% of reflection or more) by the reflection layer 51, and then the light ray is emitted from the first transparent plate material 10a toward the sun side at an angle α2' which is substantially the same as an approach angle α2.

As illustrated in FIG. 3C, the third optical path OP3 is an optical path where an entering light ray first reaches the third side 30c, is totally reflected (theoretical total reflection) at the third side 30c, reaches the first side 30a, is totally reflected (theoretical total reflection) at the first side 30a, reaches the second side 30b, and is totally reflected (reflection of 70% or more) at the reflection layer 51, and then the light ray is totally reflected (theoretical total reflection) at the first side 30a and the third side 30c and is emitted from the first transparent plate material 10a toward the sun side at an angle α3' which is substantially the same as an approach angle α3.

In order to realize such first to third optical paths OP1 to OP3, the incident angle of the first and second optical paths OP1 and OP2 to the third side 30c needs to be equal to or greater than a critical angle. Further, the incident angle of the third optical path OP3 to the first and third sides 30a and 30c needs to be equal to or greater than the critical angle.

As illustrated in FIG. 3D, the fourth and fifth optical paths OP4 and OP5 are optical paths for a light ray which is incident on the first transparent plate material 10a when the elevation angle (for example, the angles α4 and α5) is less than the predetermined angle α and enters the triangular prism 30 from the first side 30a. The first prism 30 completely transmits (theoretical total transmission) a light ray reaching the third side 30c of the light rays entering with an elevation angle less than the predetermined angle α and emits the light ray through the second transparent plate material 10b (see FIG. 1). In this case, the incident angle of the fourth and fifth optical paths OP4 and OP5 to the third side 30c needs to be less than the critical angle.

Figure 4:
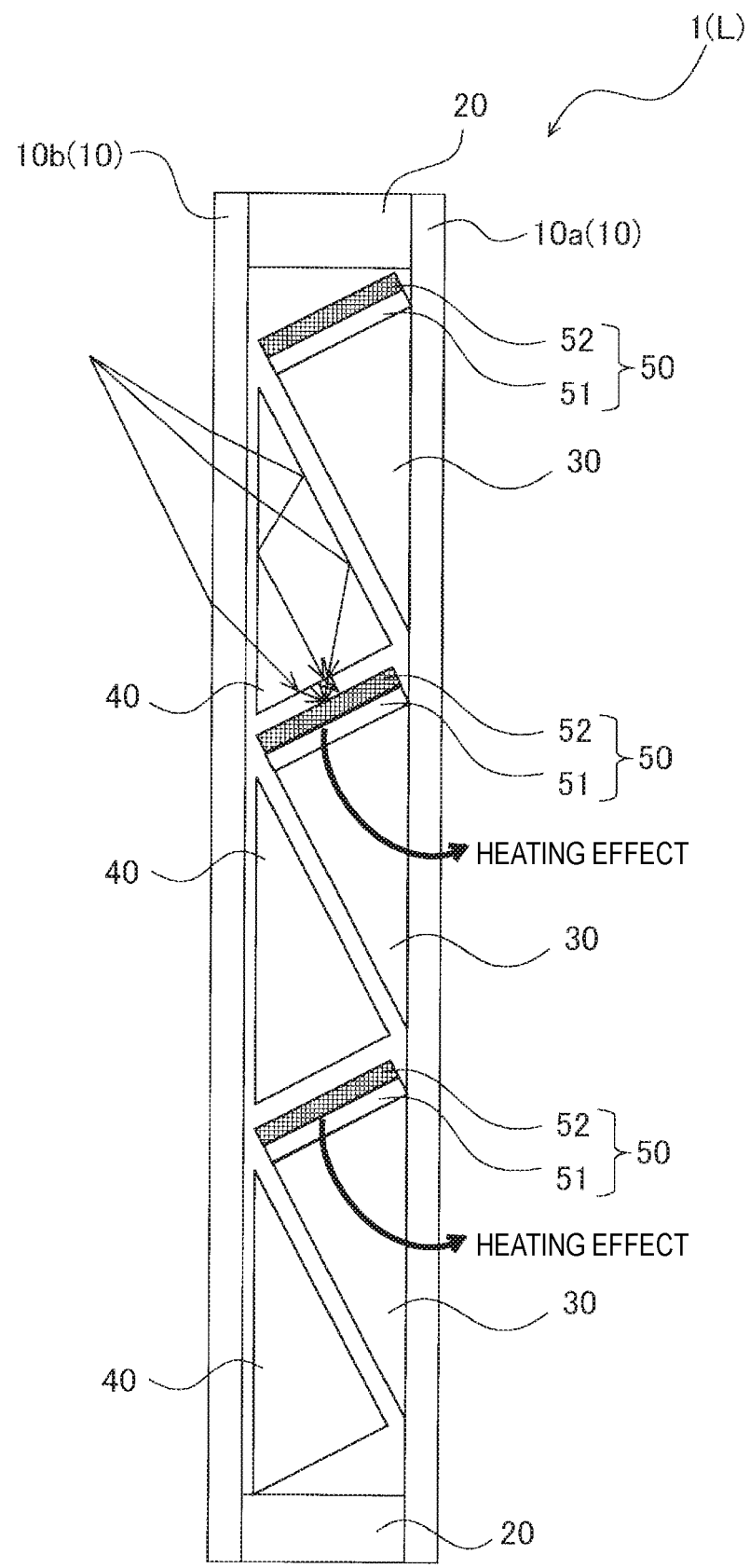
FIG. 4 is a schematic side view when the retroreflective window according to the first embodiment is vertically rotated.

FIG. 4 is a schematic side view when the retroreflective window 1 according to the first embodiment is vertically rotated. As illustrated in FIG. 4, when the laminated body L is vertically rotated, the second prism 40 has a refractive index and triangular interior angles set so that optical paths OP4 to OP8 described below are realized. Of these, the fourth and fifth optical paths OP4 and OP5 are the same as those described with reference to FIGS. 3A to 3D, so the description thereof will be omitted.

Figure 5A:
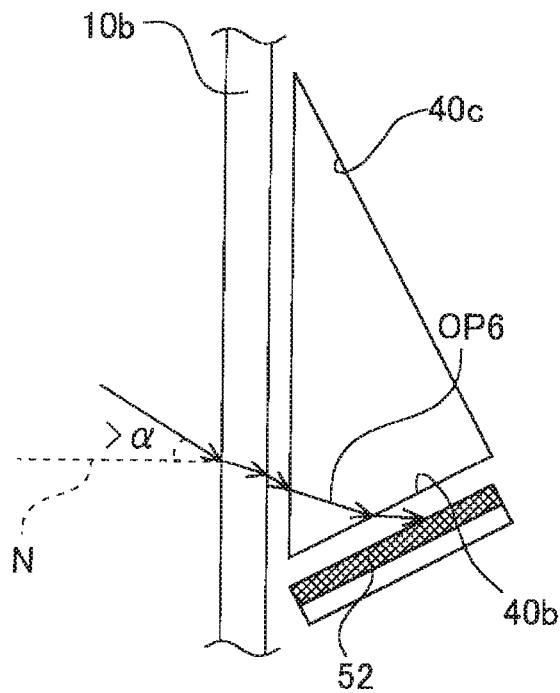
FIGS. 5A to 5C are conceptual diagrams illustrating optical paths when the retroreflective window according to the first embodiment is vertically rotated, where
Figure 5B:
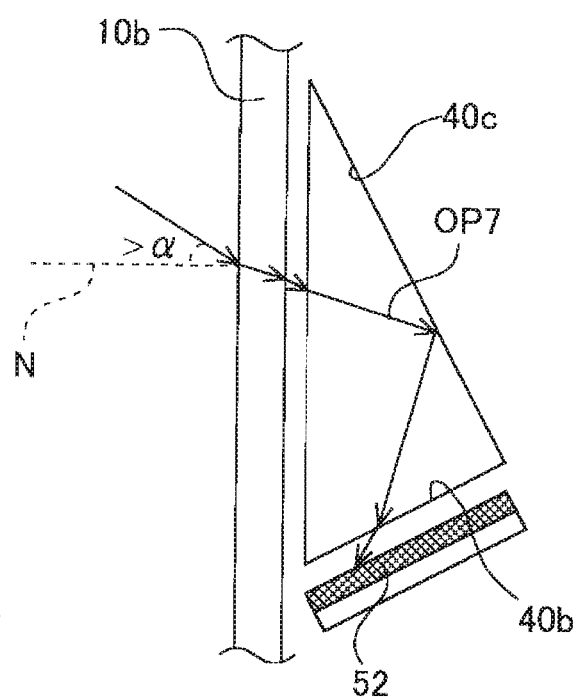
Figure 5C:
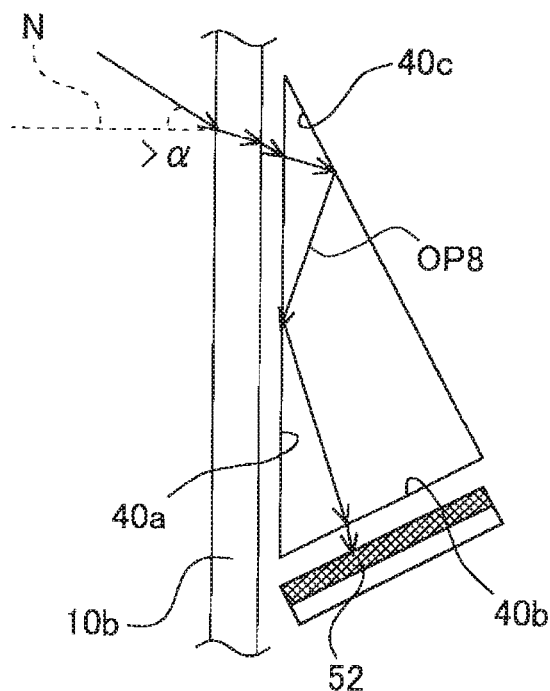

FIGS. 5A to 5C are conceptual diagrams illustrating optical paths OP6 to OP8 when the retroreflective window 1 according to the first embodiment is vertically rotated, where FIG. 5A illustrates s sixth optical path OP6, FIG. 5B illustrates a seventh optical path OP7, and FIG. 5C illustrates an eighth optical path OP8. All of the sixth to eighth optical paths OP6 to OP8 are optical paths for a light ray which is incident on the second transparent plate material 10b when an angle (that is, elevation angle when used in an upright position) with respect to the normal line N of the second transparent plate material 10b is a predetermined angle α or more and enters the second triangular prism 40 from the fourth side 40a.

As illustrated in FIG. 5A, the sixth optical path OP6 is an optical path where a light ray entering at a predetermined angle α or more reaches the fifth side 40b, is emitted from the fifth side 40b, and reaches the absorption layer 52.

As illustrated in FIG. 5B, the seventh optical path OP7 is an optical path in which a light ray entering at a predetermined angle α or more first reaches the sixth side 40c, is totally reflected (theoretical total reflection) at the sixth side 40c, reaches the fifth side 40b, is emitted from the fifth side 40b, and reaches the absorption layer 52.

As illustrated in FIG. 5C, the eighth optical path OP8 is an optical path where a light ray entering at a predetermined angle α or more first reaches the sixth side 40c, is totally reflected (theoretical total reflection) at the sixth side 40c, reaches the fourth side 40a, is totally reflected (theoretical total reflection) at the fourth side 40a, reaches the fifth side 40b, and is emitted from the fifth side 40b to reach the absorption layer 52.

In order to realize such sixth to eighth optical paths OP6 to OP8, the incident angle of the sixth optical path OP6 to the fifth side 40b needs to be less than the critical angle. Further, the incident angle of the seventh optical path OP7 to the sixth side 40c needs to be equal to or greater than the critical angle and the incident angle of the seventh optical path OP7 to the fifth side 40b after total reflection needs to be less than the critical angle. Furthermore, the incident angle of the eighth optical path OP8 on the sixth side 40c needs to be equal to or greater than the critical angle and the incident angle on the fourth side 40a after total reflection needs to be equal to or greater than the critical angle, and further the incident angle on the fifth side 40b after total reflection needs to be less than the critical angle.

Here, when the laminated body L is vertically rotated, the sixth to eighth optical paths OP6 to OP8 reach the absorption layer 52, so that the switching member 50 is efficiently heated by the direct light rays. When the switching member 50 is heated, as illustrated in FIG. 4, the first prism 30 Which is in contact with the switching member 50 is also heated, and the first transparent plate material 10a which is in contact with the first prism 30 is also heated. Therefore, the first transparent plate material 10a can be heated to bring about a heating effect on the indoor side.

The first prism 30 and the second prism 40 have the same refractive index and the same shape. Therefore, when the prisms 30 and 40 described below are adopted, the above-described first to eighth optical paths OP1 to OP8 can be realized.

In the following description, the angle (the angle formed by the fourth side 40a and the sixth side 40c) formed by the first side 30a and the third side 30c is referred to as an apex angle AA (see FIG. 1) and the angle (the angle formed by the fifth side 40b and the sixth side 40c) formed by the second side 30b and the third side 30c is referred to as a first bottom angle BA1 (see FIG. 1), and further the angle (the angle formed by the fourth side 40a and the fifth side 40b) formed by the first side 30a and the second side 30b is referred to as a second bottom angle BA2 (see FIG. 1).

FIG. 6 is a chart illustrating a relationship between the angle of the first base angle BA1 and the predetermined angle α (rounded up by 1° unit) when the refractive index of the prisms 30 and 40 is changed, when the apex angle AA of the prisms 30 and 40 is 25°.

As illustrated in FIG. 6, when the material of the prisms 30 and 40 is a porous material having a refractive index of 1.17, when the first base angle BA1 is 105°, 100°, 95°, 90°, 85°, 80°, and 75°, the predetermined angle α is 41°.

When the material of the prisms 30 and 40 is a porous material having a refractive index of 1.25, when the first base angle BA1 is 105°, 100°, 95°, 90°, 85°, 80°, and 75°, the predetermined angle α is 37°.

When the material of the prisms 30 and 40 is a porous material having a refractive index of 1.30, when the first base angle BA1 is 105° and 75°, the predetermined angle α is 41°, and when the first base angle BA1 is 100°, 95°, 90°, 85°, and 80°, the predetermined angle α is 34°.

When the material of the prisms 30 and 40 is fluororubber with a refractive index of 1.33 and water sealed, when the first base angle BA1 is 105°, 100°, 95°, 90°, 85°, 80°, and 75° in this order, the predetermined angle α is 44°, 37°, 33°, 33°, 33°, 37°, and 44°.

When the material of the prisms 30 and 40 is a fluororesin having a refractive index of 1.37 and 20% saline solution filled therein, when the first base angle BA1 is 105°, 100°, 95°, 90°, 85°, 80°, and 75° in this order, the predetermined angle α is 49°, 41°, 33°, 31°, 33°, 41°, and 49°.

When the material of the prisms 30 and 40 is acrylic with a refractive index of 1.41 and silicone enclosed, when the first base angle BA1 is 105°, 100°, 95°, 90°, 85°, 80°, and 75° in this order, the predetermined angle α is 54°, 45°, 37°, 30°, 37°, 45°, and 54°.

When the material of the prisms 30 and 40 is borosificate glass having a refractive index of 1.48, when the first base angle BA1 is 105°, 100°, 95°, 90°, 85°, 80°, and 75° in this order, the predetermined angle α is 65°, 53°, 44°, 35°, 44°, 53°, and 65°.

When the material of the prisms 30 and 40 is soda lime glass having a refractive index of 1.52, when the first base angle BA1 is 105°, 100°, 95°, 90°, 85°, 80°, and 75° in this order, the predetermined angle α is 73°, 58°, 48°, 38°, 48°, 58°, and 73°.

When the material of the prisms 30 and 40 is polycarbonate having a refractive index of 1.59, when the first base angle BA1 is 105°, 100°, 95°, 90°, 85°, 80°, and 75° in this order, the predetermined angle α is NG (NG means a value of 90° or more, which is a value that does not make sense in the product. The same applies hereinafter.), 70°, 56°, 45°, 56°, 70°, and NG.

Here, since the smaller the predetermined angle α is, the more direct light rays from the sun can be reflected to the sun side over a wider angle range and the more it can be guided to the absorption layer 52, the smaller predetermined angle α is preferable. On the other hand, it is desirable for the window to have a small apex angle AA, a wide vertical interval between the switching members 50, and an outside scene to be transmitted into the room. Therefore, it is desirable that a minimum predetermined angle α is set with respect to a certain apex angle AA and the predetermined angle α properly covers the altitude range of the sun in consideration of time and season in the installation area and direction. Further, as illustrated in FIG. 6, when the refractive index is approximately 1.41 and the first base angle BA1 is 90°, the predetermined angle α has the minimum value (30°). Therefore, it can be said that the prisms 30 and 40 preferably have a refractive index of about 1.41 and the first base angle BA1 of 90°. However, due to the problem of the material of the prisms 30 and 40, the prisms 30 and 40 may not have a refractive index of about 1.41 and the first base angle BA1 of 90° and the refractive index and the internal angle may be set so that the predetermined angle α up to the minimum value of the predetermined angle α+10° (40°) is realized.

That is, in the example illustrated in FIG. 6, when the first base angle BA1 is 75° or more and 105° or less at the refractive index of 1.25, the first base angle BA1 is 80° or more and 100° or less at the refractive indices of 1.30 and 1.33, the first base angle BA1 is 85° or more and 95° or less at the refractive indices of 1.37 and 1.41, and the first base angle BA1 is 90° at the refractive indices of 1.48 and 1.52, the predetermined angle α can be 40° or less, so it is preferable.

In the embodiment, the prisms 30 and 40 are not limited to those in which the refractive index and the internal angle are set so that the predetermined angle α of the minimum value of the predetermined angle α+10° is realized. For example, in order to realize the above-described first to eighth optical paths OP1 to OP8, when the apex angle AA is 25°, the refractive index may not be 1.59 or more and the first base angle BA1 may not be 105° or more and 75° or less. That is, the prisms 30 and 40 are in the elevation range of the altitude range that the sun can take in consideration of time and season in the installation area and direction, the refractive index and the angle may be set so that the first to eighth optical paths OP1 to OP8 are realized. The prisms 30 and 40 are not limited to the case where the refractive index and the angle are set so that the first to eighth optical paths OP1 to OP8 are realized in the entire altitude range of the sun. The refractive index and the angle may be set so that the first to eighth optical paths OP1 to OP8 are realized only in a part (for example, the highest altitude in the installation area) of the altitude range that the sun can take.

Here, FIG. 6 illustrates the predetermined angle α when the apex angle AA is 25°, but when the angle of the apex angle AA changes, the value of the predetermined angle α also changes.

FIG. 7 is a table illustrating the relationship between the angle of the first base angle BA1 and the predetermined angle α when the refractive index of the prisms 30 and 40 is changed, when the apex angle AA of the prisms 30 and 40 is 30°.

As illustrated in FIG. 7, when the material of the prisms 30 and 40 is a porous material having a refractive index of 1.17, the predetermined angle α is 35° when the first base angle BA1 is 105°, 100°, 95°, 90°, 85°, 80°, and 75°.

When the material of the prisms 30 and 40 is a porous material having a refractive index of 1.25, when the first base angle BA1 is 105°, 100°, 95°, 90°, 85°, 80°, and 75°, the predetermined angle α is 30°.

When the material of the prisms 30 and 40 is a porous material having a refractive index of 1.30, when the first base angle BA1 is 105° and 75°, the predetermined angle α is 33°, and when the first base angle BA1 is 100°, 95°, 90°, 85°, and 80°, the predetermined angle α is 27°.

When the material of the prisms 30 and 40 is a fluororubber having a refractive index of 1.33 and water enclosed, when the first base angle BA1 is 105°, 100°, 95°, 90°, 85°, 80°, and 75° in this order, the predetermined angle α is 37°, 29°, 26°, 26°, 26°, 29°, and 37°.

When the material of the prisms 30 and 40 is a fluororesin having a refractive index of 1.37 and 20% saline solution filled therein, when the first base angle BA1 is 105°, 100°, 95°, 90°, 85°, 80°, and 75° in this order, the predetermined angle α is 41°, 33°, 26°, 24°, 26°, 33°, and 41°.

When the material of the prisms 30 and 40 is acrylic with a refractive index of 1.41 and silicone enclosed, when the first base angle BA1 is 105°, 100°, 95°, 90°, 85°, 80°, and 75° in this order, the predetermined angle α is 45°, 37°, 29°, 22°, 29°, 37° and 45°.

When the material of the prisms 30 and 40 is borosilicate glass having a refractive index of 1.48, when the first base angle BA1 is 105°, 100°, 95°, 90°, 85°, 80°, and 75° in this order, the predetermined angle α is 53°, 44°, 35°, 27°, 35°, 44°, and 53°.

When the material of the prisms 30 and 40 is soda lime glass having a refractive index of 1.52, when the first base angle BA1 is 105°, 100°, 95°, 90°, 85°, 80°, and 75° in this order, the predetermined angle α is 58°, 48°, 38°, 30°, 38°, 48°, and 58°.

When the material of the prisms 30 and 40 is polycarbonate having a refractive index of 1.59, the first base angle BA1 is 105°, 100°, 95°, 90°, 85°, 80°, and 75° in this order, the predetermined angle α is 70°, 56°, 45°, 35°, 45°, 56°, and 70°.

Thus, even when the apex angle AA is 30°, when the refractive index is approximately 1.41 and the first base angle BA1 is 90°, the predetermined angle α has the minimum value (22°). Therefore, when the apex angle AA is 30°, it is preferable to set the refractive indices and the internal angles of the prisms 30 and 40 so that the predetermined angle α is 32° or less.

FIG. 8 is a chart illustrating the relationship between the angle of the first base angle BA1 and the predetermined angle α when the refractive index of the prisms 30 and 40 is changed, when the apex angle AA of the prisms 30 and 40 is 35°.

As illustrated in FIG. 8, when the material of the prisms 30 and 40 is a porous material having a refractive index of 1.17, when the first base angle BA1 is 105°, 100°, 95°, 90°, 85°, 80°, and 75°, the predetermined angle α is 29°.

When the material of the prisms 30 and 40 is a porous material having a refractive index of 1.25, when the first base angle BA1 is 105°, 100°, 95°, 90°, 85°, 80°, and 75°, the predetermined angle α is 23°.

When the material of the prisms 30 and 40 is a porous material having a refractive index of 1.30, when the first base angle BA1 is 105° and 75°, the predetermined angle α is 27°, and when the first base angle BA1 is 100°, 95°, 90°, 85°, and 80°, the predetermined angle α is 21°.

When the material of the prisms 30 and 40 is a fluororubber with a refractive index of 1.33 and water enclosed, when the first base angle BA1 is 105°, 100°, 95°, 90°, 85°, 80°, and 75° in this order, the predetermined angle α is 29°, 22°, 19°, 19°, 19°, 22°, and 29°.

When the material of the prisms 30 and 40 is a fluororesin having a refractive index of 1.37 and 20% saline solution filled therein, when the first base angle BA1 is 105°, 100°, 95°, 90°, 85°, 80°, and 75° in this order, the predetermined angle α is 33°, 26°, 19°, 17°, 19°, 26°, and 33°.

When the material of the prisms 30 and 40 is acrylic with a refractive index of 1.41 and silicone enclosed, when the first base angle BA1 is 105°, 100°, 95°, 90°, 85°, 80°, and 75° in this order, the predetermined angle α is 37°, 29°, 22°, 14°, 22°, 29°, and 37°.

When the material of the prisms 30 and 40 is borosilicate glass having a refractive index of 1.48, when the first base angle BA1 is 105°, 100°, 95°, 90°, 85°, 80°, and 75° in this order, the predetermined angle α is 44°, 35°, 27°, 19°, 27°, 35°, and 44°.

When the material of the prisms 30 and 40 is soda lime glass having a refractive index of 1.52, when the first base angle BA1 is 105°, 100°, 95°, 90°, 85°, 80®, and 75° in this order, the predetermined angle α is 48°, 38°, 30°, 22°, 30°, 38°, and 48°.

When the material of the prisms 30 and 40 is polycarbonate having a refractive index of 1.59, when the first base angle BA1 is 105°, 100°, 95°, 90°, 85°, 80°, and 75° in this order, the predetermined angle α is 56°, 45°, 35°, 27°, 35°, 45°, and 56°.

In this way, even when the apex angle AA is 35°, the predetermined angle α has the minimum value (14°) when the refractive index is approximately 1.41 and the first base angle BA1 is 90°. Therefore, when the apex angle AA is 30°, it is preferable to set the refractive indices and the internal angles of the prisms 30 and 40 so that the predetermined angle α is 24° or less.

Next, the operation of the retroreflective window 1 according to the embodiment will be described with reference to FIGS. 1 to 5C.

First, in the retroreflective window 1 according to the embodiment, in the state illustrated in FIG. 1, the first to fifth optical paths OP1 to OP5 illustrated in FIGS. 3A to 3D are realized by setting the refractive index and the internal angle of the first prism 30.

That is, the light ray entering the first prism 30 at the predetermined angle α or more with respect to the first transparent plate material 10a forms the first to third optical paths OP1 to OP3, is emitted through the first transparent plate material 10a at substantially the same angle as when entering, and is not reflected to the ground side.

Further, a part of the light rays entering the first prism 30 at the angle smaller than the predetermined angle α with respect to the first transparent plate material 10a forms the fourth and fifth optical paths OP4 and OP5. Therefore, of the light rays which enter the first prism 30 at an angle smaller than the predetermined angle α, the light ray which reaches the third side 30c is totally transmitted and emitted from the second transparent plate material 10b to the indoor side.

Further, of the light rays which enter the first prism 30 at the angle smaller than the predetermined angle α, the light ray which reaches the second side 30b undergoes total reflection (total reflection at the reflection layer 51) or total transmission, and a part of them is emitted to the indoor side and the rest is emitted to the outside of the room.

Further, it is assumed that the rotation mechanism 60 illustrated in FIG. 2 is used to make a half rotation in the vertical direction while maintaining the left and right positions of the laminated body L. In this case, in the retroreflective window 1, the second prism 40 is on the outdoor side as illustrated in FIG. 4. In this state, the retroreflective window 1 realizes the fourth and fifth optical paths OP4 and OP5 illustrated in FIGS. 3A to 3D and the sixth to eighth optical paths OP6 to OP8 shown in FIGS. 5A to 5C.

That is, light rays entering the second prism 40 at the predetermined angle α or more with respect to the second transparent plate material 10b forms the sixth to eighth optical paths OP6 to OP8 and sunlight can be collected in the absorption layer 52. As a result, the light rays can heat the first transparent plate material 10a through the first prism 30 so it is possible to provide the heating effect on the indoor side.

Further, a part of the light rays which enter the second prism 40 at an angle smaller than the predetermined angle α with respect to the second transparent plate material 10b forms the fourth and fifth optical paths OP4 and OP5. Therefore, the light rays which enter the second prism 40 at the predetermined angle α or less is totally transmitted and emitted from the first transparent plate material 10a to the indoor side unless it is blocked by the switching member 50.

In the first embodiment, since the switching member 50 is in contact with the first prism 30 and the first prism 30 is in contact with the first transparent plate material 10a, the method of heating the first transparent plate material 10a using the sunlight collected in the absorption layer 52 is adopted. However, the invention is not limited to this, and the heat medium may circulate in the absorption layer 52 and the heat medium may be heated and used in other devices or the like. In this case, the switching member 50 and the first prism 30 may not be in contact with each other and the first prism 30 and the first transparent plate material 10a may not be in contact with each other.

In this way, according to the retroreflective window 1 according to the embodiment, when the switching member 50 is in the reflective state, the first prism 30 makes a light ray incident at the predetermined angle α or more emit from the first transparent plate material 10a through the reflection on the switching member 50 and the third side 30c at approximately the same angle as when entering, and of the light rays entering at an angle smaller than the predetermined angle α, the light ray which reaches the third side 30c is transmitted and emitted from the second transparent plate material 10b. Therefore, the direct light ray from the sun can be reflected to the sun side and the light ray such as the scenery at an angle less than the predetermined angle α can be captured. Further, since the switching member 50 can be switched not only to the reflection state but also to the non-reflection state, not only the direct light ray is reflected to the sun side, but also the reflection state can be changed to the non-reflection state to enhance the usability of the direct light rays. Therefore, it is possible to provide the retroreflective window 1 capable of blocking the direct light ray and reflecting it to the sun side while maintaining the viewability and enhancing the usability of the direct light ray.

Moreover, the rotation mechanism 60 which allows the laminated body L having the first prism 30 and the like to rotate in the vertical direction is provided and the switching member 50 has the reflection layer 51 and the absorption layer 52, and thus rotation by the rotation mechanism 60 switches the state between a reflection state and an absorption state. Therefore, the rotation mechanism 60 can switch the state between the state in which the direct light ray is blocked and reflected to the sun side and the state in which the direct light ray is absorbed and used for indoor heating or the like. As a result, the usability of direct light rays can be increased.

Next, a second embodiment of the invention will be described. The retroreflective window according to the second embodiment is similar to that of the first embodiment, but part of the configuration is different. In the following description, elements which are the same as or similar to those in the first embodiment will be assigned the same reference numerals and letters and description thereof will be omitted.

Figure 9:
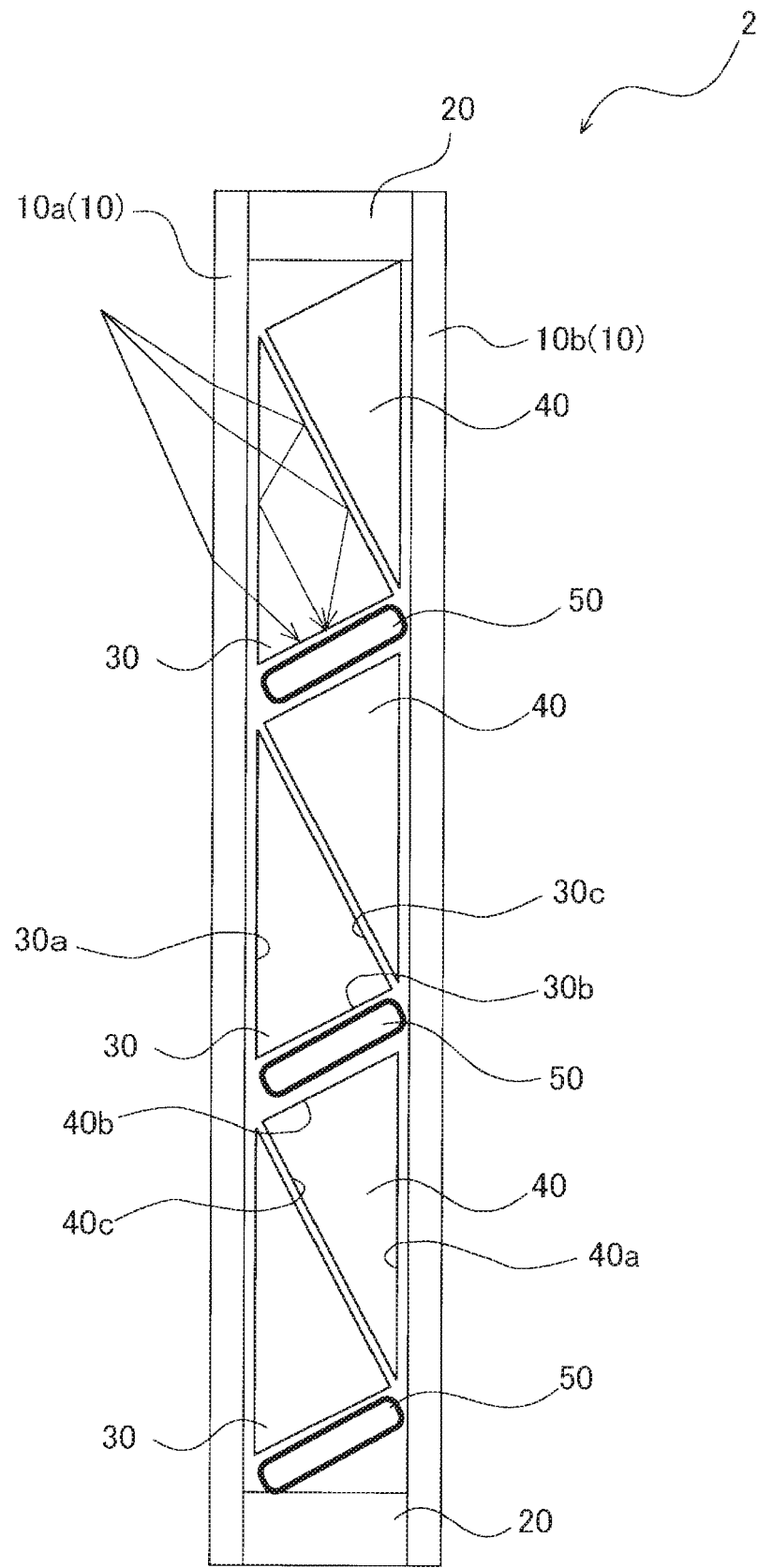
FIG. 9 is a schematic side view illustrating a retroreflective window according to a second embodiment.

FIG. 9 is a schematic side view illustrating a retroreflective window according to the second embodiment. As illustrated in FIG. 9, the switching member 50 in a retroreflective window 2 according to the second embodiment is configured by a member which can be switched between a clouded reflection state and a transparent non-reflection state (transmission state) depending on a temperature environment, a light irradiation environment, or a voltage application state. Therefore, in the second embodiment, when the switching member 50 becomes cloudy and is in a reflective state, the direct light ray is reflected to the sun side, and when it becomes transparent and is in a non-reflective state, the direct light ray can be taken into the indoor side. Further, in the following description, the transmissive state will be described as the non-reflective state. However, it is not necessarily limited to the transmissive state and may be in the absorbing state.

Specifically, the switching member 50 is made of a material such as thermochromic, photochromic, electrochromic, and the like whose color changes when exposed to high temperatures, irradiation with ultraviolet rays, or the like, or a component such as electronic paper. For example, Umglass, which is a type of electrochromic, becomes transparent when a voltage is applied and becomes cloudy and reflects light rays when a voltage is not applied. Further, the electronic paper of many technologies, for example, a magnetophoretic black-and-white switching display type can be used.

Further, the switching member 50 is not limited to the above material and may be composed of a transparent tube and a specific liquid. Here, some liquids having Lower Critical Solution Temperature (LCST) properties become transparent below the phase separation temperature and become cloudy above the phase separation temperature (cloud point). For example, an N-isopropylacrylamide aqueous solution has a cloud point near body temperature, below which it has a transmittance of approximately 100%, and above that, it has a transmittance of approximately 0%. Therefore, such a liquid may be enclosed in a transparent tube to form the switching member 50.

Next, the operation of the retroreflective window 2 according to the second embodiment will be described.

First, in the retroreflective window 2 according to the second embodiment, it is assumed that the switching member 50 becomes cloudy and is in a reflective state. In this case, the light rays entering the first prism 30 at the predetermined angle α or more with respect to the first transparent plate material 10a is emitted through the first transparent plate material 10a at substantially the same angle as the approach angle and is not reflected to the ground side, as in the first embodiment.

Furthermore, even for light rays which enter the first prism 30 at an angle smaller than the predetermined angle α with respect to the first transparent plate material 10a, the light ray which reaches the third side 30c is completely transmitted and emitted from the second transparent plate material 10b to the indoor side.

On the contrary, it is assumed that the switching member 50 becomes transparent and is in a non-reflection state. In this case, when light rays entering the first prism 30 at the predetermined angle α or more with respect to the first transparent plate material 10a reach the switching member 50, the light rays pass through the switching member 50 and are emitted from the second transparent plate material 10b to the indoor side through the second prism 40. Therefore, it is possible to bring the lighting effect into the room by utilizing the direct light rays.

Further, the light rays which enter the first prism 30 at an angle smaller than the predetermined angle α is also emitted from the second transparent plate material 10b to the indoor side.

In this way, according to the retroreflective window 2 according to the second embodiment, as similar to the first embodiment, it is possible to provide the retroreflective window 2 which can block the direct light ray and reflect it to the sun side while maintaining the viewability and can enhance the usability of the direct light rays.

Further, since the switching member 50 is composed of a member which switches a state between the clouded reflection state and the transparent non-reflection state depending on the temperature environment or the voltage application state, when it becomes cloudy, the direct light ray can be blocked and reflected to the sun side, and when it becomes transparent, the direct light ray can be taken into the room. Therefore, the usability of the direct light rays can be improved.

Next, a third embodiment of the invention will be described. A retroreflective window according to the third embodiment is similar to that of the first embodiment, but part of the configuration is different. In the following description, elements which are the same as or similar to those in the first embodiment will be assigned the same reference numerals and letters and description thereof will be omitted.

Figure 10:
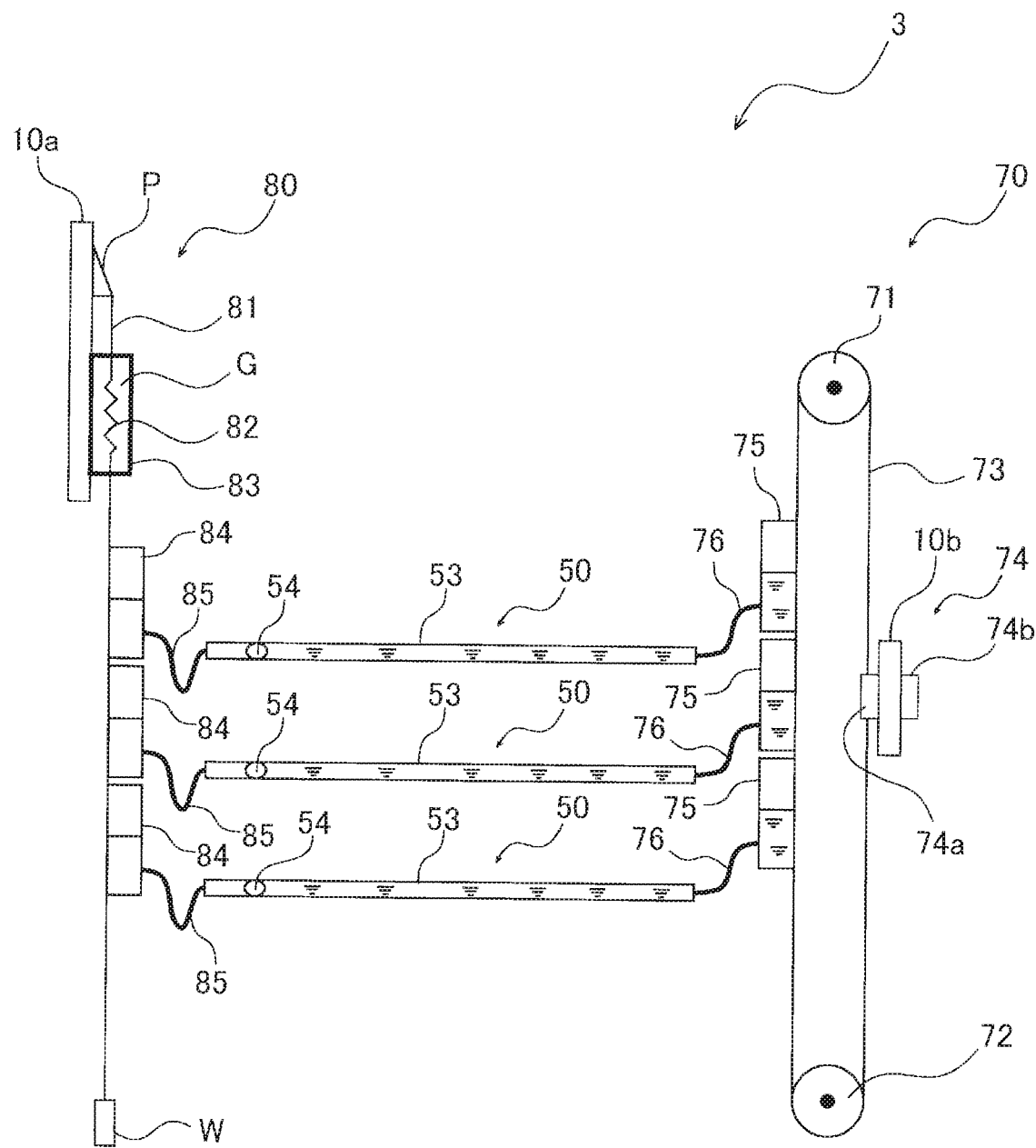
FIG. 10 is a partial configuration diagram illustrating a retroreflective window according to a third embodiment.

FIG. 10 is a partial configuration diagram illustrating a retroreflective window 3 according to the third embodiment. In addition, in FIG. 10, the switching member 50 is illustrated as viewed from the stacking direction of the laminated body L. As illustrated in FIG. 10, the retroreflective window 3 according to the third embodiment includes operating mechanisms 70 and 80 for switching a state of the switching member 50 between a reflective state and a non-reflective state. In addition, in the third embodiment, an example in which the two operating mechanisms 70 and 80, that is, the first operating mechanism 70 and the second operating mechanism 80 are provided will be described. However, the retroreflective window 3 according to the third embodiment may have only one of the operating mechanisms 70 and 80.

First, in the third embodiment, the switching member 50 includes a transparent hollow member 53 and is capable of switching a state between a reflective state in which a white or silver liquid is enclosed in the hollow member 53 and a non-reflective state in which a transparent liquid is enclosed. In such a switching member 50, the transparent liquid can be introduced from one end side of the hollow member 53 and the white or silver liquid can be introduced from the other end side. The switching member 50 is provided with a jelly-like gel pig 54 for separating two liquids inside the hollow member 53.

The first operating mechanism 70 is for switching the state of the switching member 50 between the reflective state and the non-reflective state by a user operation and includes an upper pulley 71, a lower pulley 72, a ladder cord 73, an operating portion 74, a plurality of liquid storage containers 75, and a plurality of flexible tubes 76.

The upper pulley 71 and the lower pulley 72 are pulley members provided on an upper side and a lower side of the retroreflective window 3. The ladder cord 73 is an endless cord member wound around the upper pulley 71 and the lower pulley 72. An operating portion 74 and a plurality of liquid storage containers 75 are attached to the ladder cord 73.

The operating portion 74 includes, for example, an internal magnet 74a and an external magnet 74b. The internal magnet 74a is a magnet member arranged in the internal space formed by the two plate members 10 and the peripheral end member 20 and is connected to the ladder cord 73. The external magnet 74b is attracted to the internal magnet 74a via the second transparent plate material 10b located on the indoor side. The internal magnet 74a and the external magnet 74b are composed of strong magnets such as neodymium magnets.

A plurality of liquid storage containers 75 are arranged vertically along a vertically extending ladder cord 73 and the liquid storage container 75 is a container which stores a transparent liquid. The liquid storage containers 75 are provided in the same number as the switching members 50 and each liquid storage container 75 is connected to one end of each switching member 50 through the flexible tube 76 having flexibility.

The second operating mechanism 80 is for automatically switching the state of the switching member 50 between the reflective state and the non-reflective state, irrespective of a user operation. The second operating mechanism 80 includes a cord member 81, a weight W, a shape memory alloy spring 82, a grease case 83, a heat transfer grease G, a plurality of liquid storage containers 84, and a plurality of flexible tubes 85.

The cord member 81 is a cord member where an upper end is attached to a triangular protrusion P protruding from the first transparent plate material 10a and the weight W is attached to a lower end. The shape memory alloy spring 82 is a member which can expand or contract depending on the ambient temperature. The shape memory alloy spring 82 is interposed between the cord members 81 and is accommodated in the grease case 83. The inside of the grease case 83 is filled with the heat transfer grease G. Further, the grease case 83 is provided in contact with one transparent plate material 10a.

A plurality of liquid storage containers 84 are arranged vertically along the cord member 81 extending vertically and the liquid storage container 84 is a container which stores a white or silver liquid. The same numbers of liquid storage containers 84 as the number of switching members 50 are provided and each liquid storage container 84 is connected to the other end of each switching member 50 through the flexible tube 85 having flexibility.

Next, the operation of the retroreflective window 3 will be described in the third embodiment. First, it is assumed that the outside temperature is high in the summer. In this case, the outside air temperature is transmitted from the first transparent plate material 10a to the shape memory alloy spring 82 through the grease case 83 and the heat transfer grease G and the shape memory alloy spring 82 is in a tension state. When the shape memory alloy spring 82 is in a tension state, the cord member 81 is pulled up and the plurality of liquid storage containers 84 are also pulled up.

When a user moves the external magnet 74b of the operation portion 74 upward in this state, the plurality of liquid storage containers 75 move downward through the ladder cord 73. As a result, the position of the liquid storage container 84 in which the white or silver liquid is stored is raised and the position of the liquid storage container 75 in Which the transparent liquid is stored is lowered.

Therefore, the white or silver liquid of the liquid storage container 84 pushes the gel pig 54 toward the one end side and the switching member 50 is in a reflective state. When the switching member 50 is in the reflective state, the direct light ray is reflected to the sun side as in the first and second embodiments.

On the other hand, it is assumed that the outside temperature is low in winter. In this case, the outside air temperature is transmitted from the first transparent plate material 10a to the shape memory alloy spring 82 through the grease case 83 and the heat transfer grease G and the shape memory alloy spring 82 is in a relaxed state. When the shape memory alloy spring 82 is in the relaxed state, the cord member 81 is lowered and the positions of the plurality of liquid storage containers 84 are also lowered.

When a user moves the external magnet 74b of the operation portion 74 downward in this state, the plurality of liquid storage containers 75 move upward through the ladder cord 73. As a result, the position of the liquid storage container 84 storing the white or silver liquid is lowered and the position of the liquid storage container 75 storing the transparent liquid is raised.

Therefore, the transparent liquid of the liquid storage container 75 pushes the gel pig 54 to the other end side and the switching member 50 is in a non-reflective state. When the switching member 50 is in the non-reflecting state, the direct light ray is taken into the indoor side as in the second embodiment.

In this way, according to the retroreflective window 3 according to the third embodiment, as similar to the first embodiment, it is possible to provide the retroreflective window 3 which can block the direct light ray and reflect it to the sun side while maintaining the viewability and can improve the usability of the direct light ray.

Further, according to the third embodiment, the switching member 50 is configured by the transparent hollow member 53 and can switch a state between the reflective state in which the white or silver liquid is sealed and the non-reflective state in which the transparent liquid is sealed. Therefore, the direct light ray can be blocked and reflected to the sun side when the white or silver liquid is enclosed and the direct light ray can be taken into the room when the transparent liquid is enclosed. Therefore, the usability of the direct light ray can be improved.

The invention is described above based on the embodiments. However, the invention is not limited to the above embodiments and modifications may be made without departing from the spirit of the invention and other techniques may be appropriately combined within a possible range. Further, known or well-known techniques may be combined within a possible range.

Figure 11:
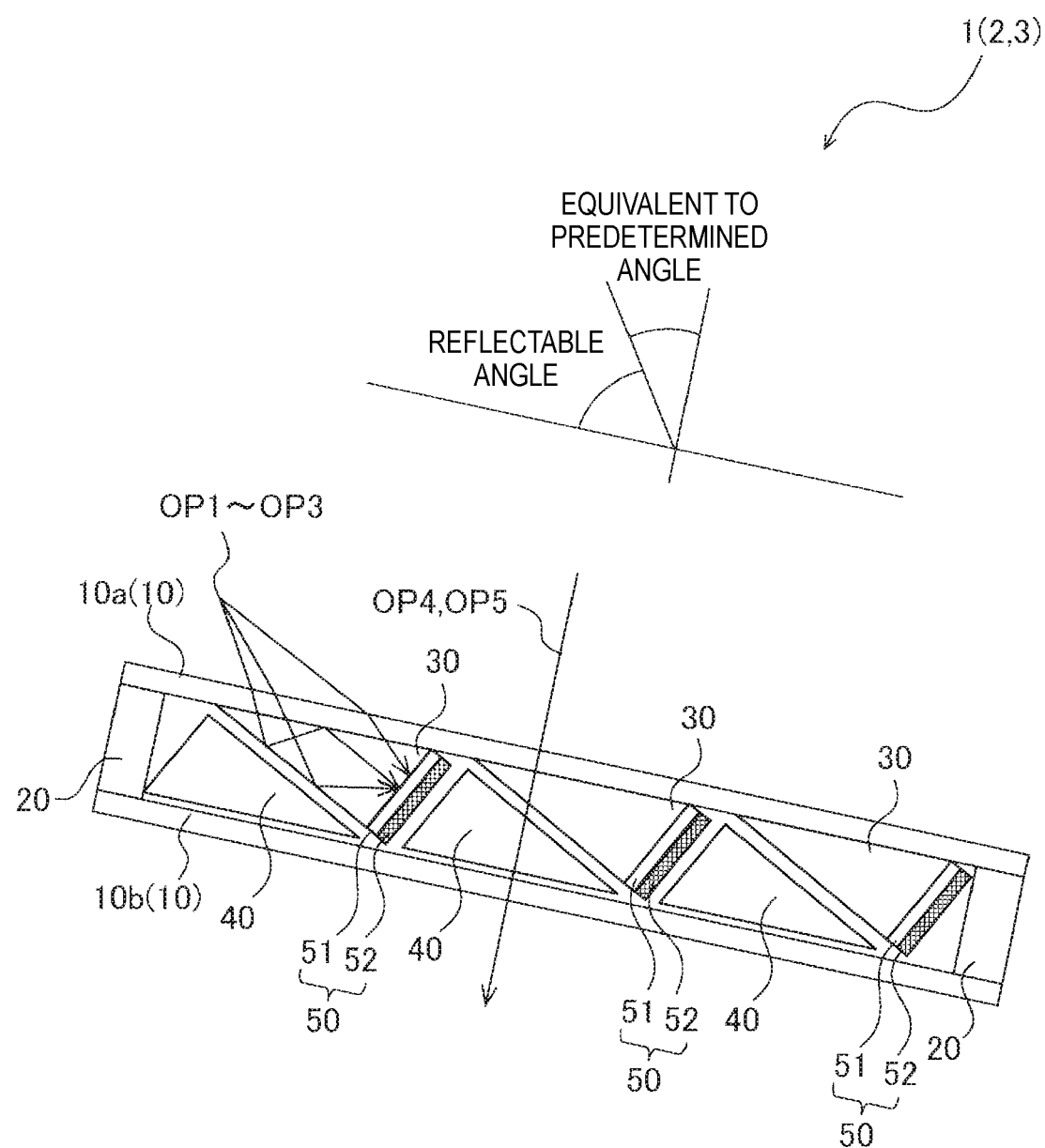
FIG. 11 is a schematic side view illustrating an example when the retroreflective window is used for an inclined surface.

For example, in the embodiments, examples in which the retroreflective windows 1 to 3 are used for the upright surface are described, but the retroreflective windows 1 to 3 may be used not only for the upright surface but also for an inclined surface (for example, a roof surface). FIG. 11 is a schematic side view illustrating an example in which the retroreflective windows 1 to 3 are used for the inclined surface. As illustrated in FIG. 11, the retroreflective windows 1 to 3 may be used, for example, in an inclined surface which inclines to the north side in Japan. This is because even in such a case, the optical paths OP1 to OP8 and the like can be realized from the relationship with the predetermined angle during the elevation.

In the embodiments described above, the retroreflective windows 1 to 3 have a two-layer structure of the first transparent plate material 10a and the second transparent plate material 10b, but may have a transparent plate material with a three-or-more layer structure.

Further, in the second embodiment, the clouded reflection state and the transparent non-reflection state are switched. However, the invention is not limited to this and may be configured to switch a state between a clouded reflection state and a blackened absorption state (absorption rate of 70% or more). In this case, the switching member 50 may be composed of a component such as a magnetophoretic electronic paper. In this example, as similar to the first embodiment, the switching member 50 is brought into contact with the second prism 40 or the heating medium is heated by using the switching member 50, in such a manner that the direct light ray can be converted into heat and then taken into the room.

Similarly, the third embodiment may be configured to switch a state between the reflective state in which a white or silver liquid is filled and the absorbing state (absorption rate of 70% or more) in which a black liquid is filled. In this case, the liquid container 84 is filled with a black liquid.

Although various embodiments are described above with reference to the drawings, it goes without saving that the invention is not limited to such examples. It is obvious to those skilled in the art that various changes or modifications can be conceived within the scope of the claims and it is understood that those of course also belong to the technical scope of the invention. Further, the constituent elements in the above-described embodiments may be arbitrarily combined without departing from the spirit of the invention.

The present application is based on the Japanese patent application filed on Feb. 9, 2018 (Japanese Patent Application No. 2018-021509), the contents of which are incorporated herein by reference.

REFERENCE SIGNS LIST 1 to 3: retroreflective window
10a: first transparent plate material
10b: second transparent plate material
30: first prism (triangular prism)
30a: first side
30b: second side
30c: third side
40: second prism (second triangular prism)
40a: fourth side
40b: fifth side
40c: sixth side
50: switching member
51: reflection layer
52: absorption layer
53: hollow member
60: rotation mechanism
L: laminated body (flat plate)
N: normal line
OP1 to OP8: first to eighth optical paths
α: predetermined angle

What is claimed is:

1. A retroreflective window, comprising:
a first transparent plate material and a second transparent plate material arranged substantially parallel to each other;
a transparent triangular prism which is disposed between the first and second transparent plate materials and includes a first side along a first transparent plate material in cross section and a second and third sides having an angle with respect to the first side; and
a switching member which is installed facing the second side, which is a lower side of the second and third sides, and can be switched between a reflective state in which a reflectance of visible light rays and infrared rays is 70% or more and a non-reflective state in which the reflectance of visible light rays and infrared rays is 30% or less, wherein
when the switching member is in the reflective state, in the triangular prism,
a light ray incident on the first transparent plate material at an angle equal to or greater than a predetermined angle with respect to a normal line of the first transparent plate material and entering the triangular prism from the first side is reflected from the switching member and the third side, and then emitted from the first transparent plate material at the same angle as when entering, and
among light rays incident on the first transparent plate material with an angle to the normal line less than the predetermined angle and entering the triangular prism from the first side, the light ray reaching the third side is transmitted and emitted from the second transparent plate material.

2. The retroreflective window according to claim 1, further comprising:
a transparent second triangular prism which has the same shape as the triangular prism in cross section, includes a fourth side in contact with the second transparent plate material and fifth and sixth side having an angle with respect to the fourth side, and is arranged so as to be point-symmetrical to the triangular prism; and
a rotation mechanism capable of rotating in a vertical direction while maintaining left and right positions of a flat plate body having the first and second transparent plate materials, the triangular prism, the second triangular prism, and the switching member, wherein
the switching member includes,
a reflection layer which is provided in contact with the second side of the triangular prism and has a reflectance of visible light rays and infrared rays of 70% or more, and
an absorption layer which is provided on a back side of the reflection layer, spaced apart from the fifth side of the second triangular prism, and has an absorption rate of 70% or more of visible light rays and infrared rays, and
rotation by the rotation mechanism switches a state between the reflective state and the non-reflective absorbing state.

3. The retroreflective window according to claim 1, wherein
the switching member is composed of a member which can switch a state between the clouded reflective state and the transparent non-reflective state depending on a temperature environment, a light irradiation environment, or a voltage application state or a member which can switch a state between the cloudy reflection state and the blackened non-reflection state by a magnetophoretic method.

4. The retroreflective window according to claim 1, wherein
the switching member is composed of a transparent hollow member and is capable of switching a state between the reflective state in which a white or silver liquid is filled and the non-reflective state in which a transparent liquid or a black liquid is filled.

* * * * *